United States Patent Office 2,877,687
Patented Mar. 17, 1959

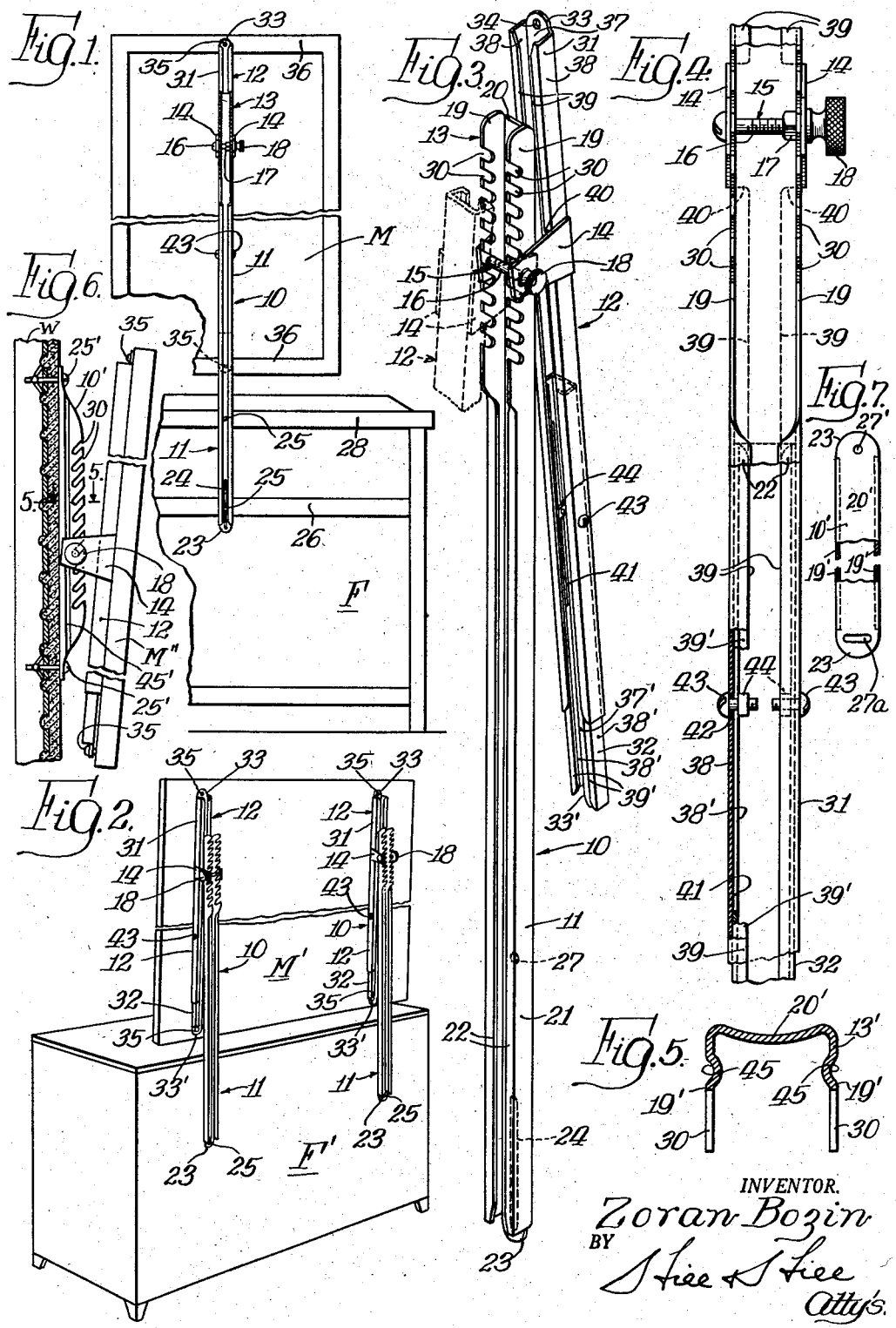

2,877,687

MIRROR SUPPORT

Zoran Bozin, Chicago, Ill.

Application March 17, 1955, Serial No. 494,861

13 Claims. (Cl. 88—99)

This invention relates to a mirror support, and the principal object of the invention is to provide an adjustable supporting structure in combination with mirrors in adjusted vertical relationship with respect to the top of a dresser, vanity or other type of furniture, either in household or furniture store displays, and to hold the mirror in either its vertical or angular adjusted position.

Prior to this invention, mirror-supporting devices such as disclosed and claimed in De Boer—No. 1,926,994 granted September 12, 1933; Garrett—No. 2,607,553 granted August 19, 1952; and Haugaard—No. 2,688,901 granted September 14, 1954 have been used but in each of these devices there is no provision for angular adjustment of the mirror to tilt the mirror as the user desires, nor is there particular provision for providing a universal mounting to provide a support for different size mirrors so that one mirror support may be used to take different sizes and weights of mirrors.

It is therefore another object of the invention to provide an improved universal mirror support wherein one mirror support may be used for moderate size mirrors of different sizes, and two or more mirror supports may be used wherein the mirror size and the weight thereof is such that the weight should be distributed to prevent damage to the mirror or to the furniture to which it is assembled.

Another object of the invention is to provide a mirror support to give the effect of being supported on the wall directly to the rear of the mirror and against which the dresser or other piece of furniture is positioned.

Another object of the invention is to provide a mirror support for display purposes in a salesroom so that different sizes and shapes of mirrors may be supported from the furniture in order for the customer to determine the mirror desired.

Still another object of the invention is to provide a mirror support including a tilting structure wherein the mirror support is fastened to the base of a dresser or vanity and the mirror can be easily tilted, raised, or lowered to the preferred position without adjusting the mirror support.

Another object of the invention is to provide a mirror support or structure to universally fit substantially all sizes and shapes of mirrors in conventional furniture lines as well as to provide a support for stationary and hanging mirrors erected on walls of a room for ornamental purposes.

With the advent of large and heavy mirrors for use with double or triple dressers, furniture manufacturers provided these mirrors as setting or hanging mirrors only due to the size and shape. It is therefore another object of the invention to provide a mirror support for use with large and heavy mirrors furnished with double or triple dressers.

Also, these large and heavy mirrors are not usually suitable to be wood framed and constructed to be adjustable as a tilting or swinging mirror which is most popular in mirror displays. It is another object of the invention to provide a mirror support which can be applied in multiple for use with large and heavy mirrors to provide adjustability so that the mirror may be suitably tilted.

Although in the past it has been customary to rigidly mount large mirrors to walls for ornamental purposes or to use picture wire and suitable brackets, it is also another object of the invention to provide a mirror support which is equally adapted for mounting mirrors directly to walls for tilting or alternatively used for mounting mirrors directly to the furniture with which the mirror is to be used.

Another object of the invention is to provide a mirror structure suitable not only to support small and medium size mirrors but to equally support extra heavy mirrors, and wherein normally a single mirror support is suitable for extra large size mirrors, the mirror support may be used in multiples as required.

In order to accomplish the above objects of the invention, it is preferred to use a mirror support formed from suitable gauge sheet steel fabricated into a channel-shaped or tubular-shaped section. The mirror support preferably comprises an elongated supporting bracket for mounting to the furniture or wall surface provided with means for securing to the furniture and wall, and the upper end provided with means for securing to the furniture and wall, and the upper end provided with means for vertically adjusting a mounting member for the mirror which is detachably and adjustably mounted for either vertically adjusting the mirror with respect to the furniture, and for angularly adjusting the mirror from either a vertical position to a predetermined tilted position of the mirror within a suitable angular range, and which also permits the mirror to be readily detached and attached to the elongated supporting bracket. The mounting member which is affixed to the mirror is provided with telescopic upper and lower sections which is adapted for adjustment for conventional mirror sizes. The mirror support may be fabricated and assembled with the mounting member directly attached to the mirror and with the supporting bracket attached to the furniture prior to shipment. It is also within the scope of the invention that the mirror support may be fabricated and assembled and sold as a unit to be erected in place by the purchaser. The mirror support may also be assembled in place by the furniture installer after the furniture has been delivered to the user. The mirror supports of this invention may be readily installed by either a skilled or unskilled person with a minimum of tools.

Many other objects and advantages of the construction herein shown and described will be obvious to those skilled in the art from the disclosure herein given.

To this end, my invention consists of the novel construction, arrangement, and combination of parts herein shown and described and more particularly pointed out in the claims.

In the drawings, wherein like reference characters represent like or corresponding parts:

Fig. 1 is a rear view showing a mirror support for mounting a mirror over an article of furniture by the improved mirror support or mounting device;

Fig. 2 is a perspective view showing another use of the improved mirror support for supporting an extra large mirror with mirror supports in a multiple arrangement;

Fig. 3 is a perspective view illustrating the mirror support or mounting device with the mounting member for the mirror shown in a tilted position;

Fig. 4 is an enlarged view, partly in section, illustrating the securing means of the adjusting means for mounting the mirror mounting member of the mirror support on the elongated support bracket thereof, and also showing the telescopic adjustment of the mounting member for the mirror;

Fig. 5 illustrates, partly in section, a modified channel-shaped section of the elongated support bracket taken along the line 5—5 of Fig. 6, looking in the direction of the arrows;

Fig. 6 is a view in elevation, partly in section, of a modified mirror support for mounting mirrors to a wall; and Fig. 7 is a plan view, partly in section, of the rear face of the mirror support of Fig. 6.

Referring now to the drawings, particularly Figs. 1, 3, and 4, there will be described the improved mirror support and method of assembly to a mirror and piece of furniture with which the mirror support is used.

A mirror support or mounting device 10 preferably comprises an elongated tubular or channel-shaped support bracket 11 to which is adjustably mounted a mirror mounting member 12 adjustably and detachably affixed together by a channel-shaped adjusting means 13 integrally formed at the upper end of the support bracket 11. Laterally spaced bracket means 14 affixed to the upper end of the mounting member 12 is spaced apart a distance to receive the channel-shaped adjusting means 13, and is frictionally held in place by securing means 15. The securing means 15 comprises a stove bolt or the like threaded means 16 extending through holes (not shown) in the bracket members 14. A lock nut 17, Fig. 4, is threadably mounted on the threaded means 16 to abut an inner face of one of the legs of the channel-shaped adjusting means 13. A knurled securing means or nut 18 is threaded on the outer end of the bolt 16 for clamping the brackets against the outer faces of the legs 19 of the channel-shaped adjusting means 13. A nut 17 may be so adjusted that as the knurled nut 18 is clamped in position, sufficient friction is placed between the parts 14 and 19 to frictionally hold the mounting member 12 in any of its adjusted positions from either a vertical position to a tilted position within the angular range of its adjustment.

Referring to Fig. 3, the elongated tubular-shaped support bracket 11 is preferably formed from sheet metal or strip steel of mild or low carbon or other suitable carbon content, permitting formation into the shape shown from substantially 16 gauge or within the range of from 14 to 18 gauge, depending on the size and weight of the mirror to be supported. The support bracket 11 is preferably tubular in shape or channel-shaped, having a base 20, sides 21, and inturned flanges 22. The lower end of the base 20 is formed with a semi-circular member 23. An elongated slot 24 substantially six inches long and three-sixteenth of an inch wide is punched or otherwise suitably formed in the base 20 to provide means for adjustment of the securing means 25 for affixing the lower end of the bracket 11 to a transverse support 26 on a piece of furniture. A hole 27 is provided for receiving another securing means 25 for affixing the support bracket to an upper transverse brace 28 of the furniture F to which the mirror is to be affixed. The distance from the bottom end of the support to a gauge line (not shown) corresponding to the top of the dresser is twelve inches. The hole 27 is preferably located one and one-half inches from the gauge line or top of the dresser.

The channel-shaped adjusting means 13 is approximately eleven and one-half inches long and shaped as illustrated in Fig. 3. Each leg 19 is formed with oppositely arranged and downwardly inclined slots 30 which are spaced vertically approximately three-fourths of an inch apart at a suitable angle, for example 45°, such that the depth of the slot is substantially nine-sixteenths of an inch vertically from the upper edge of the legs 19. For the purpose of illustration, ten slots have been shown. It is within the scope of the invention that any suitable number and spacing may be used as desired, and positioned at an angle which will readily permit the assembly of the mounting member to the elongated support bracket so that the mirror will not readily become detached.

The preferred channel size used for the support bracket 11 is approximately one and one-fourth inches overall and five-eighths of an inch for the depth of legs and the inturned flanges 22 are approximately five-sixteenths of an inch in width. In fabricating the legs 19 of the adjusting means 13, the tubular member 11 is suitably heated at the upper end and the inturned flanges outwardly swaged, as shown, to form continuations of the sides 21 of the channel, and therefore form the legs 19 in which the slots 30 are then suitably punched or milled. The elongated supporting bracket, after it has been fabricated, may be suitably plated and polished or otherwise ornamentally finished as desired.

Referring to Figs. 3 and 4, the mirror mounting member 12 is preferably formed from an upper tubular or channel-shaped member 31 in which is complementally telescoped a lower channel or tubular member 32. The upper and lower ends of the mounting member 12 are formed as illustrated in Figs. 1, 2, and 3 with a semi-circular end 33 and 33' provided with holes 34 in which are mounted securing means 35 for affixing the mounting member to transverse members 36 at the back of a mirror M, Fig. 1, or to other suitable backing as shown in Fig. 2 of a mirror M'. The telescopic sections 31 and 32 are also formed from strip steel or sheet metal strip of mild or low carbon steel from preferably 16 gauge or within the range from substantially 18 to 14 gauge depending on the size of mirror to be supported. The upper tubular member 31 is substantially tubular or channel-shaped having a base 37, side edges 38, and inturned flanges 39. The lower tubular member 32 is also tubular or channel-shaped in cross section, and comprises a complementally formed structure to telescopically slide within the upper tubular member 31. It comprises a base 37', complementally formed side edges 38', and inwardly extending flanges 39'. The upper tubular member 31 is formed with locating notches 40 in the inwardly extending flanges 39, Figs. 3 and 4, contiguous to which the bracket members 14 are welded to the side edges 38 and suitably aligned so that the securing means 15 may be properly located in the slots 30 of the adjusting means 13. The distance between the bracket members 14 correspond to the width of the channel-shaped support bracket 11 which is also substantially the same as that of the upper tubular member 31. The overall width of the channel-shaped member 31 is substantially one and one-fourth inches and the length thereof is substantially twenty-seven and three-eighth inches. From the upper end of the member 31 to the centerline of the securing means 15, the distance is substantially ten inches and from the base of the member 14 to the centerline of the opening for the securing means the distance is one and seven-eighth inches.

In order to telescope and secure the telescoping members 31 and 32 together, referring to Figs. 3 and 4, the side edges 38' are provided with slots 41. The length of the slot is such as to provide adjustment of the mirror mounting member to mount various sizes of mirrors having an overall width of from substantially twenty-eight to thirty-six inches. The mirror-mounting member 12 is adjustable from twenty-eight to thirty-five inches. It is to be understood that other suitable lengths may be provided. In order to affix the telescoping members 31 and 32 in their adjusted position, holes 42 are drilled in the side edges 38 of the lower tubular member 32. Stove bolts 43 are inserted through the holes and nuts 44 are assembled thereto. The spacing between the inside face of the base member 37' and the inside face of the flanges 39' is such as to prevent turning of the nut so that once the nut is affixed to the bolt, the adjustment may be made by using a screw driver only for loosening and tightening the bolts or securing means for any adjustment of the telescoping members 31 and 32.

Referring to Fig. 5, there is illustrated a modified cross section of the channel-shaped support bracket 11, particularly taken through a cross section of the channel-shaped adjusting means 13. The modified channel-shaped adjusting means 13' is similarly formed as the adjusting means 13 of Fig. 3 with the exception that the legs 19' which are formed with similar slots 30 have a longitudinally extending reinforcing bead 45 which preferably extends the length of the channel-shaped adjusting means 13'. However, it is within the scope of the invention that the beads 45 may extend the full length of the channel-shaped support bracket 11. Similarly, the base 20' may be inwardly shaped as shown in Fig. 5 to give further reinforcing. Any other cross-sectional design may be used which will increase the moment of inertia or section modulus of the member or bracket 11, and the shape will depend upon the thickness of the metal used for fabricating the channel-shaped support bracket 11. Similarly, the telescoping members 31 and 32 may also be formed with a reinforced cross section using beading or other means if a thinner gauge metal is used for forming the telescoping structures. Although mild steel has been described as the material used for producing the mirror support construction, it is within the scope of the invention that other materials such as aluminum and the like may be used, depending on the availability and the competitive price thereof.

Referring to Fig. 1, if the mirror for the dresser or other piece of furniture is of such a size that only a single support is necessary, when the furniture is delivered and an installer sets up the mirror, the mirror-mounting member is positioned on the centerline of the mirror and affixed as illustrated at the upper and lower ends. The main load is carried by the upper screw 35 whereas the lower screw 35 acts as a stabilizing support although when assembled together and the mirror-mounting member 12 is properly adjusted and the screws 43 are tightened, the mirror is supported by both the upper and lower mounting screws 35. The channel-shaped support bracket 11 has also been properly located on the back of the dresser or furniture to its respective centerline and affixed by the securing means 25. The securing means 15 has been affixed to the supporting brackets 14 and the mirror is then raised and telescoped with respect to the adjusting means 13. The securing means 15 is located in the proper slots 30 to locate the bottom edge of the mirror the desired distance above the top of the dresser or piece of furniture. The knurled nut 18 may then be tightened to securely mount the mirror in its vertical or tilted position as desired. The friction is such between the inner face of the bracket member 14 and the outer faces of the legs 19 as to hold the mirror in any adjusted position, if it is desired to change the tilt.

If the mirror is of such a size as illustrated in Fig. 2, as used with double and triple dressers now in style, it is preferred to use at least two mirror support brackets 10. The mirror mounting members 12 are first properly located on the back of the mirror, after which the channel-shaped support brackets 11 are similarly mounted on the back of the dresser or other type of furniture with which a mirror is used in conjunction. The mirror supports 10 including the mirror mounting member 12 have been so designed as to be adjustable for any conventional size of large mirror or medium size mirror, and have been designed to support the heaviest mirror used within the range from twenty to eighty pounds. It is also within the scope of the invention that heavier mirrors may be used if the members of the mirror support are so designed to support the added weight. The telescoping adjustment of the mirror mounting member permits the members 12 to be properly adjusted and the position of the slot 24 and upper securing hole 27 permit the channel-shaped support bracket to be properly supported on the transverse members, for example, 26 and 28 as illustrated in Fig. 1. The securing means or mounting screws 25 for the support bracket 11 will carry the load of the heaviest mirrors which are normally used in conjunction with furniture of this type. Although it is preferred to use wood mounting screws, other forms of securing means may be used. If metal furniture is used, metal screws may be used or also conventional bolts and nuts for mounting the support bracket 11. The cross section of the supporting bracket 11 is so chosen as to give rigid support without bending under the weight of the mirrors used in conjunction therewith. Although it is preferred to use the mounting screws 25, other conventional forms of securing means such as U-shaped brackets and the like affixed to the back of the article of furniture and in turn affixed to the support bracket 11, may be used without departing from the scope of the invention.

Although the invention has been disclosed primarily for applying a mirror to a dresser or similar article of furniture when finally installed in the home, it is also within the scope of the invention that the mirror support of this invention may be used for demonstrating in a store or display room different types of mirrors with the furniture until the customer has made his selection. Likewise, it is within the scope of the invention that the mirror support is equally adapted for mounting mirrors on the wall, especially large and heavy mirrors. When used in this manner, the mirror mounting member 12 would be reversed to the dotted position as shown in Fig. 3 so that instead of the adjusting means of the support bracket 11 telescoping between the securing means and the mirror mounting member 12, the securing means of the mirror-mounting member 12 would be adjusted and mounted in the slots 30 from the front face. When used in this manner, the base 20 of the channel-shaped support bracket 11 is affixed flush to the wall. Any tilt desired may be provided within the angular range of adjustment of the bracket members 14. If greater angular adjustment is desired, the bracket 14 may be lengthened. However, the minimum length of these brackets is such as to provide for telescoping of the outer edges of the legs 19 to be inserted between the face of the inner flanges 39 of the mirror-mounting member 12 and the securing means 15.

Although the knurled nut 18 has been shown as illustrated in Figs. 1, 3, and 4, the securing means may be reversed so that the knurled nut is on the opposite side as shown in the mounting on the left side of Fig. 2. This permits the knurled nuts to be reached from the side of the dresser or other article of furniture to tighten or loosen the nut without moving the furniture away from the wall to adjust. Obviously, with large dressers of the type as illustrated in Fig. 2, and with the large mirrors used therewith, it would be necessary for at least two people to raise and lower the mirror to adjust the mirror vertically with respect to the slots 30. However, with the smaller size mirror such as shown in Fig. 1, one person may adjust the mirror as desired.

Although the mirror support has been shown in Figs. 1 and 2 for single or multiple use of the mirror support, it is also within the scope of the invention that more than two may be used. However, when more than two supports are used, the ability to properly align the mirror supports is decreased. If more than two are used, rods or the like may be mounted to align the slots 30 of the support brackets 11 and, similarly, rods may be used to align the holes of the bracket 14 for the securing means. To provide proper adjustment and to have the mirror properly erected, in addition to a screw driver and square, a carpenter's level may also be used.

Referring to Figs. 5, 6, and 7, a modified form of mirror support 10' will be described for mounting a mirror on a wall, especially where the mirror although heavy in weight is of such a size that the elongated channel-shaped support bracket 11 of the mirror support described with reference to Figs. 1, 2, 3, and 4 would extend below the mirror unless an exceptionally large mirror was being mounted. The mirror support 10' is perferably formed 14" long and of the same size stock as that of the channel-shaped support bracket 11. It is preferably formed of a lighter gauge material and may be formed in cross-section as shown in Fig. 5 with the beads 45. It is also formed with substantially the same number of slots 30 to provide for adjustment of the mirror depending on the size and shape thereof. The mirror mounting member 12 is formed as described with reference to Fig. 3 and is attached to the rear of the mirror in the same manner as described with reference to Fig. 1. The bracket members 14 are mounted so that the mirror mounting member 12 is positioned as shown in Fig. 6 and also as in the dotted position, Fig. 3. The securing means 15 including the bolt 16 and knurled securing means 18 is adjusted as described with reference to Figs. 3 and 4. Once the mirror has been properly adjusted with respect to the mirror support 10', the knurled nut 18 may be firmly secured and the friction between the bracket members 14 and the outer faces of the legs 19' holds the mirror in the adjusted position, permitting the mirror to be tilted as shown in Fig. 6 in any preferred position or in the opposite direction or held in a vertical position as desired.

In mounting the mirror support 10' on a wall W including studding, lath, and plaster as illustrated or any other type of wall, the holes for the toggle bolts 25' are properly located, after which the mirror support 10 is mounted and affixed in position on the wall by assembling the toggle bolts through the holes 27' and slot 27a. The slot 27a permits slight adjustment vertically of the mirror support so that it may be mounted vertically and adjusted to its proper vertical position by a level. The mirror M" may then be assembled as illustrated in Fig. 6.

Although the mirror support 10' has been illustrated for use with toggle bolts, other forms of mounting devices such as "Mollys" of the type as disclosed and claimed in U. S. Patents 2,018,251 and 2,559,281 may be used or ordinary wood screws. It is also preferred to use a mirror support bracket having a cross-section such as illustrated in Fig. 5 so that lighter gauge material may be used, but it is also within the scope of the invention that the mirror support may be made from material within the range of from 14 to 18 gauge, depending on the size and weight of the mirror to be supported, though it is preferred to use 16 gauge material for ordinary size mirrors. It is also within the scope of the invention that a mirror support of the type illustrated in Fig. 3 may be used for mounting mirrors on the wall in which case the mirror mounting member 12 is reversed as shown in the dotted position. When mounted on a wall, it is also preferred that a hole shall be provided at the upper end of the member 11 corresponding to the hole 27' of the member 10'.

Although the invention has been primarily described as being sold in conjunction with the furniture, it is also within the scope of the invention that the support may be sold as a separate device and suitably installed by the purchaser.

It is also within the scope of the invention that although the parts may be suitably plated with a chrome, nickel, or cadmium finish, the parts may also be suitably enameled, stained, or otherwise finished to match the furniture to which they are affixed.

Although the invention has been primarily disclosed for the purpose of erection of the mirror to an article of furniture in the home after it has been delivered, it is also within the scope of the invention that the parts may be installed at the factory, after which they are dismantled for shipment to be reinstalled in the proper position, and it is also within the scope of the invention that the securing means such as the screws may be properly located for mounting the mirror support in position, the mirror supports and parts either being partly erected in place or dismantled to be later assembled in position. The mirror support of this invention is readily adapted to be shipped in a knockdown condition in a minimum size package.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. The combination with a dresser having a mirror, of a mounting member for the mirror affixed to the back of the mirror contiguous to the upper and lower edges thereof, laterally spaced bracket members extending rearwardly from the mounting member for the mirror and affixed to the upper end of the aforesaid mounting member, an elongated supporting bracket affixed to the back of the dresser, the upper end of the supporting bracket provided with downwardly inclined slots, complementally formed securing means on the upper end of the elongated supporting bracket and said mounting member for detachably mounting the mirror to the supporting bracket above the top of the dresser in a pre-selected position, and said complementally formed securing means operatively mounted on the bracket members of the mounting member for the mirror and operatively engaging one of said downwardly inclined slots.

2. The combination with a dresser including a large mirror, of laterally spaced mounting members for the mirror affixed to the back of the mirror contiguous to the upper and lower edges thereof, laterally spaced bracket members for each of the mounting members for the mirror extending rearwardly from their respective mounting members and affixed to the upper ends of their respective mounting members, a plurality of elongated supporting brackets similarly laterally spaced as the mounting members and affixed to the back of the dresser, the upper ends of each of the supporting brackets provided with downwardly inclined slots, complementally formed securing means on the upper ends of each of the elongated supporting brackets and on the mounting members for detachably mounting the mirror to the supporting brackets above the top of the dresser in a pre-selected position, and said complementally formed securing means operatively mounted on the bracket members of each mounting member for the mirror and operatively engaging oppositely arranged slots of the aforesaid laterally spaced elongated supporting brackets.

3. The combination with a dresser having a mirror of a predetermined size, of a universal mounting member for the mirror affixed to the back of the mirror contiguous to the upper and lower edges thereof, said universal mounting member permitting adjustment to fit different size mirrors, said universal member including telescopic upper and lower channel-shaped members, bracket members affixed to the sides of the upper channel-shaped member and intermediate the ends thereof, complementally formed adjusting and securing means for adjusting the mounting member to a predetermined mirror size, an elongated supporting bracket including means for detachably and adjustably mounting the elongated supporting bracket to the bracket members of the universal mounting member, and said elongated supporting member being affixed to the dresser, whereby different size mirrors may be supported on a dresser.

4. The combination with a dresser having a mirror of a predetermined size, of a telescopic universal mounting member for the mirror affixed to the mirror contiguous to the upper and lower edges thereof, said universal mounting member permitting adjustment to fit different size mirrors, an elongated supporting bracket affixed to the dresser and including means for detachably and adjustably mounting the universal mounting member, said last-mentioned means including a plurality of vertically spaced and downwardly inclined slots on the side edges of the elongated supporting bracket, laterally extending support members affixed to the side edges of the universal mounting member and spaced downwardly from the upper end of the universal mounting member, and securing means extending between the side edges of the elongated supporting bracket and laterally extending support members and comprising a bolt and a lock nut in threaded engagement and abutting one of the support members contiguous to the slot within which the securing means is mounted, and a knurled securing means affixed to the end of the bolt for clamping the support members of the universal mounting member to the slotted means at the upper end of the elongated supporting bracket, whereby the mirror is mounted in its pre-selected vertical position above the top of the dresser and in its pre-selected angular position from a vertical position to a tilted position of the mirror.

5. The combination with a dresser having a mirror, of laterally spaced telescopic mounting members for the mirror affixed to the back of the mirror contiguous to the upper and lower edges thereof, a plurality of elongated supporting brackets similarly laterally spaced as the mounting members and affixed to the dresser, each of said elongated supporting brackets including adjusting means at the upper end of said elongated supporting brackets, said adjusting means comprising a plurality of vertically spaced and downwardly inclined slots on the opposite edges of the elongated supporting bracket, complementally formed securing means on each of the mounting members for adjustably and detachably mounting the mirror to the supporting brackets above the top of the dresser in a pre-selected position, said complementally formed securing means comprising laterally extending support members affixed to the side edges of the mounting member intermediate the ends thereof, said securing means also including a bolt means extending transversely of the support members and adapted to be detachably received in each of said downwardly inclined slots for vertical adjustment of the mirror, said bracket members being of a length and spaced apart to detachably receive the adjusting means whereby each mounting member may be detached from and vertically adjusted with respect to the supporting brackets from one position to another for adjusting the mirror above the top of the dresser, and said securing means frictionally clamping the bracket members to the adjusting means so that in any position of the mirror from its vertical position to a tilted position, the mirror is frictionally held in place.

6. The combination with a dresser having a mirror of a predetermined size, of a universal telescopic mounting member for the mirror affixed to the mirror contiguous to the upper and lower edges thereof, said universal mounting member permitting adjustment to fit different size mirrors, said universal member including telescopic channel-shaped members, one of said members slotted at the upper ends of the side edges thereof, securing means operatively mounted in the side edges of the telescopic member contiguous to the slots of the inner telescopic member for adjusting the length of the mounting member to fit the size of the mirror to be mounted, bracket members mounted on the side edges of the outer telescopic channel-shaped member intermediate the upper end of the outer telescopic channel-shaped member and the upper end of the telescopic channel-shaped member and the securing means therefor, an elongated channel-shaped supporting bracket affixed to the dresser, said channel-shaped member including inwardly extending flanges along the upper edges of the side members of the channel-shaped member for detachably and adjustably mounting the universal mounting member formed at the upper end of the elongated supporting bracket, said adjusting means including the side edges of the channel-shaped member and the inwardly extending flanges formed in a channel-shaped arrangement which is integral with the side edges and inwardly extending flanges, said adjusting means formed with a plurality of vertically spaced and downwardly inclined slots, securing means for frictionally clamping the bracket members of the universal mounting member to the channel-shaped adjusting means, and said channel-shaped adjusting means spaced between the bracket members, the length of the bracket members being of such a length to permit the universal mounting member to be vertically adjusted with respect to the channel-shaped adjusting member when the securing means is detached from any of the oppositely spaced downwardly inclined slots formed therein, and said securing means and the channel-shaped adjusting means abutting the inner faces of the bracket members for frictionally securing the universal mounting member in each of its vertical and angular adjusted positions.

7. As an article of manufacture, a mirror support for mounting a mirror over an article of furniture, said mirror support permitting the mirror to be detachably mounted and adjustable both vertically and angularly, said mirror support comprising an elongated channel-shaped member for affixing to an article of funiture and having inwardly extending flanges at the upper edges of the sides of the elongated channel-shaped member, said elongated channel-shaped member formed from sheet metal, said elongated channel-shaped member formed with a channel-shaped adjusting means at the upper end of the elongated channel-shaped member, the legs of said channel-shaped adjusting means extending beyond the width of the legs of the channel-shaped portion of the elongated channel-shaped member, a plurality of vertically spaced and downwardly inclined slots symmetrically formed in the legs of the channel-shaped adjusting means, a mounting member for the mirror formed from a channel-shaped element having inwardly extending flanges at the upper edges of the legs of the mounting member, and bracket means affixed to the mounting member to detachably receive therebetween the channel-shaped adjusting means of the elongated channel-shaped member, and means for frictionally securing the bracket members to the channel-shaped adjusting means, whereby in each of the vertically adjusted positions of the mounting member the mounting member is affixed in its pre-selected vertical and tilted position.

8. As an article of manufacture, a mirror support for detachably and adjustably mounting a mirror comprising an elongated tube-like supporting bracket, channel-shaped adjusting means comprising a plurality of vertically spaced and downwardly inclined slots symmetrically formed on opposite side edges of the tube-like supporting bracket, a telescopic universal mounting member for the mirror including telescopic tube-like members for adjusting the length of the mounting member to correspond to the mirror size, one of said tube-like telescopic mounting members provided with slots on the side edges thereof, securing means for adjustably affixing the tubular mounting members in any of their adjusted positions, and bracket means mounted on the side edges of the outer tube-like member including frictional clamping means for detachably and adjustably affixing the mounting member to the channel-shaped adjusting means of the elongated tube-like supporting bracket.

9. As an article of manufacture, a support for mounting a mirror to a vertical surface comprising an elongated tubular member, means for affixing the elongated tubular member to a vertical wall surface in at least two positions at spaced points at the bottom of the elongated tubular member, channel-shaped adjusting means formed at the opposite end of the elongated tubular member including a plurality of vertically spaced means to provide for vertical adjustment of the mirror, a telescopic tubular mounting member for the mirror including upper and lower telescopic tubular members, means at opposite ends of the telescopic tubular mounting member for affixing the telescopic tubular mounting member to the mirror, and bracket means affixed to the upper telescopic member including securing means complementally formed to the vertically spaced adjusting means of the channel-shaped adjusting means for frictionally securing the telescopic tubular mounting member in a vertical and any one of its tilted positions.

10. As an article of manufacture, an elongated tubular-shaped supporting bracket including side edges and inturned flanges, for vertically and angularly adjusting a mirror-mounting member to be operatively mounted on the elongated tubular-shaped supporting bracket, said elongated tubular-shaped supporting bracket including spaced means at one end for affixing the elongated tubular-shaped supporting bracket to a vertical surface, and channel-shaped adjusting means at the opposite end including oppositely arranged and downwardly inclined slots integrally formed from the side edges and inturned flanges of the elongated tubular-shaped supporting bracket and for vertically and angularly adjusting the aforesaid mirror-mounting member.

11. As an article of manufacture, a telescopic tubular universal mounting member of a mirror mounting member for a mirror including upper and lower telescoped tubular members, said upper and lower members permitting adjustment thereof to fit pre-selected mirror sizes, means for adjustably securing the telescopic members in any of their adjusted positions, means at the outer ends of the telescopic tubular members for affixing the mirror mounting member to a mirror, and bracket means affixed to the outer tubular mounting member including transversely extending securing means, and said bracket means and securing means complementally formed to adjustably receive complementally formed means of a supporting bracket of the mirror mounting member to which the mounting member is adapted to be detachably affixed.

12. The combination with a mirror of a predetermined size, of a telescopic universal mounting member of a mirror support for the mirror affixed to the back of the mirror contiguous to the upper and lower edges thereof, said telescoping universal mounting member including upper and lower telescoping members, laterally spaced and rearwardly extending bracket members affixed to the upper telescoping member, a channel-shaped supporting member for affixing to a surface of a wall for supporting the mirror from the wall, said channel-shaped supporting member including vertically spaced means formed on the opposite legs of the channel-shaped supporting member to vertically and angularly position the mirror with respect to the channel-shaped supporting member, said length of the channel-shaped supporting member being less than that of the telescopic universal mounting member to which it is affixed, and securing means operatively mounted on said bracket members and adapted to engage the aforesaid vertically spaced means for adjustably affixing the telescopic universal mounting member to the channel-shaped supporting member.

13. As an article of manufacture, a hidden support for mounting a mirror upon a wall comprising a channel-shaped member, means for affixing the channel-shaped member to the wall in at least two positions at spaced points at the bottom of the channel-shaped member, said channel-shaped member including outwardly extending legs, adjusting means formed along the length of the legs of the channel-shaped member including a plurality of vertically spaced means to provide for vertical adjustment of the mirror upon the wall, a telescopic tubular mounting member for the mirror including upper and lower telescopic tubular members, means at opposite ends of the mounting member for affixing the mounting member to the mirror, said length of the channel-shaped member being less than the length of the telescopic tubular mounting member, and bracket means affixed to the upper telescopic member including securing means complementally formed to the vertically spaced adjusting means of the channel-shaped member for frictionally securing the telescopic tubular mounting member in a vertical and one of its tilted positions.

References Cited in the file of this patent
UNITED STATES PATENTS

| Number | Name | Date |
| --- | --- | --- |
| 125,913 | Thomson | Apr. 23, 1872 |
| 1,300,137 | Douglas | Apr. 8, 1919 |
| 1,748,849 | Schmidt | Feb. 25, 1930 |
| 1,926,994 | De Boer | Sept. 12, 1933 |
| 1,951,583 | Swanson | Mar. 30, 1934 |
| 2,313,532 | Garrett | Mar. 9, 1943 |
| 2,335,896 | Anderson | Dec. 7, 1943 |
| 2,530,876 | Harris | Nov. 21, 1950 |
| 2,592,086 | Viney | Apr. 8, 1952 |
| 2,607,553 | Garrett | Aug. 19, 1952 |
| 2,652,272 | Wood | Sept. 15, 1953 |
| 2,675,132 | Susil | Apr. 13, 1954 |
| 2,677,521 | Willingham | May 4, 1954 |
| 2,688,901 | Haugaard | Sept. 14, 1954 |
| 2,694,543 | Norris | Nov. 16, 1954 |

FOREIGN PATENTS

| Number | Country | Date |
| --- | --- | --- |
| 470,413 | France | Sept. 10, 1914 |